United States Patent
Imanuel

(10) Patent No.: US 10,783,731 B2
(45) Date of Patent: Sep. 22, 2020

(54) WIRELESS TAG-BASED LOCK ACTUATION SYSTEMS AND METHODS

(71) Applicant: Spectrum Brands, Inc., Middleton, WI (US)

(72) Inventor: Derek Imanuel, Anaheim, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 16/397,484

(22) Filed: Apr. 29, 2019

(65) Prior Publication Data

US 2019/0333301 A1    Oct. 31, 2019

Related U.S. Application Data

(60) Provisional application No. 62/663,664, filed on Apr. 27, 2018.

(51) Int. Cl.
| | |
|---|---|
| *G06F 13/42* | (2006.01) |
| *G07C 9/28* | (2020.01) |
| *G07C 9/00* | (2020.01) |
| *E05B 47/00* | (2006.01) |
| *H04W 4/80* | (2018.01) |

(52) U.S. Cl.
CPC ............ *G07C 9/28* (2020.01); *E05B 47/0001* (2013.01); *G07C 9/00309* (2013.01); *H04W 4/80* (2018.02); *E05B 2047/0018* (2013.01); *G07C 2009/00333* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 9,109,378 B2* | 8/2015 | Scalisi | E05B 47/0001 |
| 9,674,124 B1 | 6/2017 | Fisher et al. | |
| 2012/0280783 A1* | 11/2012 | Gerhardt | G07C 9/00309 340/5.6 |
| 2013/0210360 A1 | 8/2013 | Ljung et al. | |
| 2013/0293351 A1 | 11/2013 | Kuenzi et al. | |
| 2014/0145823 A1* | 5/2014 | Aase | H04W 4/80 340/5.61 |
| 2014/0191848 A1 | 7/2014 | Imes et al. | |
| 2014/0375421 A1 | 12/2014 | Morrison et al. | |

(Continued)

FOREIGN PATENT DOCUMENTS

KR    10-1470747 B1    12/2014

OTHER PUBLICATIONS

PCT Application No. PCT/US2017/039719; Written Opinion and International Search Report dated Aug. 31, 2017, 12 pages.

(Continued)

*Primary Examiner* — Adolf Dsouza
(74) *Attorney, Agent, or Firm* — Merchant & Gould P.C.

(57) ABSTRACT

A wireless electronic lockset includes a processing unit, a locking bolt, a motor, a wireless communication tag, and a wireless interface. The lockset is capable of connecting to a mobile device via a first communication protocol and/or a second communication protocol. The lockset sends a value to the mobile device via the first communication protocol and receives an actuation command via the second communication protocol if the mobile device has been verified by a server. The actuation command causes the lockset to lock or unlock the door.

23 Claims, 10 Drawing Sheets

(56) References Cited

U.S. PATENT DOCUMENTS

| | | |
|---|---|---|
| 2015/0027178 A1 | 1/2015 | Scalisi et al. |
| 2015/0040205 A1 | 2/2015 | Van Till et al. |
| 2015/0101369 A1 | 4/2015 | Scalisi |
| 2015/0170448 A1 | 6/2015 | Robfogel et al. |
| 2015/0199859 A1 | 7/2015 | Ouyang et al. |
| 2015/0269799 A1 | 9/2015 | Martinez et al. |

OTHER PUBLICATIONS

U.S. Appl. No. 15/626,617; Non-Final Rejection dated Dec. 15, 2017, 20 pages.
U.S. Appl. No. 15/626,617; Final Rejection dated Jul. 12, 2018, 13 pages.
U.S. Appl. No. 15/626,617; Notice of Allowance dated Nov. 20, 2018, 10 pages.

\* cited by examiner

WIRELESS TAG-BASED LOCK ACTUATION SYSTEMS AND METHODS

CROSS-REFERENCE TO RELATED APPLICATIONS

The present application claims priority from U.S. Provisional Patent Application No. 62/663,664, filed on Apr. 27, 2018, the disclosure of which is hereby incorporated by reference in its entirety.

BACKGROUND

Wireless electronic locksets for residential premises, e.g., at residential exterior doors, are becoming increasingly popular for user convenience. For example, certain types of wireless electronic locksets may await a signal from a mobile device of a user to actuate an unlocking operation at a door. Other types of devices may allow actuation (e.g., unlocking) of the lockset if an authorized mobile device is within proximity of the lockset.

However, these existing wireless electronic locksets have drawbacks with respect to security and convenience. For example, such locksets may have difficulty determining whether a user's mobile device is located at an outside side of a door, rather than inside the residence, for example because location detection may lack accuracy. If the lockset cannot determine whether the mobile device is outside, an unauthorized user may enter a residence simply because the mobile device is in proximity of the door and lockset. To address this problem, complex multi-antenna systems have been developed. However, even in these situations, a user may be outside a premises, but may not intend to unlock the door despite being in proximity to the door. For example, the user may be within wireless range of the door but the door may not be visible to the user. Or the user may be at the door, but may not wish to unlock the door for some reason. As such, some additional intent to unlock the door may be desirable.

Still further locksets may actuate based on touch of the lockset. Such solutions may utilize a conductive touch surface to detect user activation, and subsequently connect with and authenticate the user based on the presence of the user's mobile device. However, these systems still require complex directional antenna systems. Still further, in cases where it is dark or cold, it may be difficult for the user to correctly touch a correct conductive surface of the wireless lockset for actuation. Accordingly, additional solutions that enhance convenience of a user are sought.

SUMMARY

In summary, the present disclosure relates to an arrangement and methodology for authenticating a user by processing signals captured by a mobile device and a wireless electronic lockset. In particular, a wireless electronic lockset comprises at least one wireless communication protocol capability that communicates with a mobile device that can be detected by sensing circuitry in the mobile device and in the wireless electronic lockset. The wireless electronic lockset sends a value to the mobile device, which is validated by a key server and the wireless electronic lockset may allow validation of the user and actuation of the wireless electronic lockset.

In a first aspect, a wireless electronic lockset is disclosed. The wireless electronic lockset includes a processing unit, a locking bolt movable between locked and unlocked positions, a motor actuatable by the processing unit to move the locking bolt between the locked and unlocked positions, a wireless communication tag operable using a first wireless communication protocol, and a wireless interface communicatively connected to the processing unit, the wireless interface configured to communicate using a second wireless communication protocol different from the first wireless communication protocol. The wireless electronic lockset is configured to execute instructions to perform, in response to detecting proximity of a mobile device to the wireless communication tag, sending a value stored in the wireless communication tag via the first wireless protocol to the mobile device using the first wireless communication protocol. In response to validation of the mobile device based on the received value, receiving, via the second wireless communication protocol, an actuation command, and in response to receipt of the actuation command, actuating the motor to move the locking bolt between the lock and unlocked positions.

In another aspect, a method of actuating a wireless electronic lockset is described. The method includes in response to detecting proximity of a mobile device to a wireless communication tag of the wireless electronic lockset, sending a value via a first wireless protocol to the mobile device; in response to validation of the mobile device based on the value, receiving, via a second wireless communication protocol, an actuation command; and actuating a motor to move a locking bolt of the wireless electronic lockset between a locked and unlocked position.

In another aspect, a system for actuating a wireless electronic lockset is provided. The system comprises a wireless electronic lockset comprising a processing unit, a locking bolt moveable between a locked and unlocked position, a motor actuatable by the processing unit to move the locking both between the locked and unlocked position, a wireless communication tag operable using a first wireless communication protocol, and a wireless interface communicatively connected to the processing unit. The wireless interface configured to communicate using a second wireless communication protocol is different from the first wireless communication protocol. The processing unit executes instructions to perform: in response to detecting proximity of a mobile device to the wireless communication tag, sending a value stored in the wireless communication tag via the first wireless communication protocol to the mobile device using the first wireless communication protocol. An application is installable on the mobile device, which when executed, causes the mobile device to preform: establishing a secure connection to the wireless electronic lockset via the first wireless communication protocol, receiving from the processing unit, the value via the first wireless communication protocol, and sending an actuation command to the wireless electronic lockset via the second wireless communication protocol, wherein based on a similarity correlation determining that the value sent to the mobile device from the processing unit and the value sent to a key server from the mobile device, actuating the motor to move the locking both between the locked and unlocked positions upon receiving the actuation command.

In yet another aspect, a method of actuating a wireless electronic lockset is provided. The method comprises establishing a secure connection to the wireless electronic lockset via a first communication protocol, in response to detecting a second communication protocol by being in close proximity to the lock, receiving a value via the second wireless protocol to the mobile device, transmitting the value and an identifies, wherein the identifier is associated with an account that has been previously been associated with the wireless electronic lockset, to a key server for validation, and in response to receiving a validation confirmation, transmitting an actuation command via the first communication protocol.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
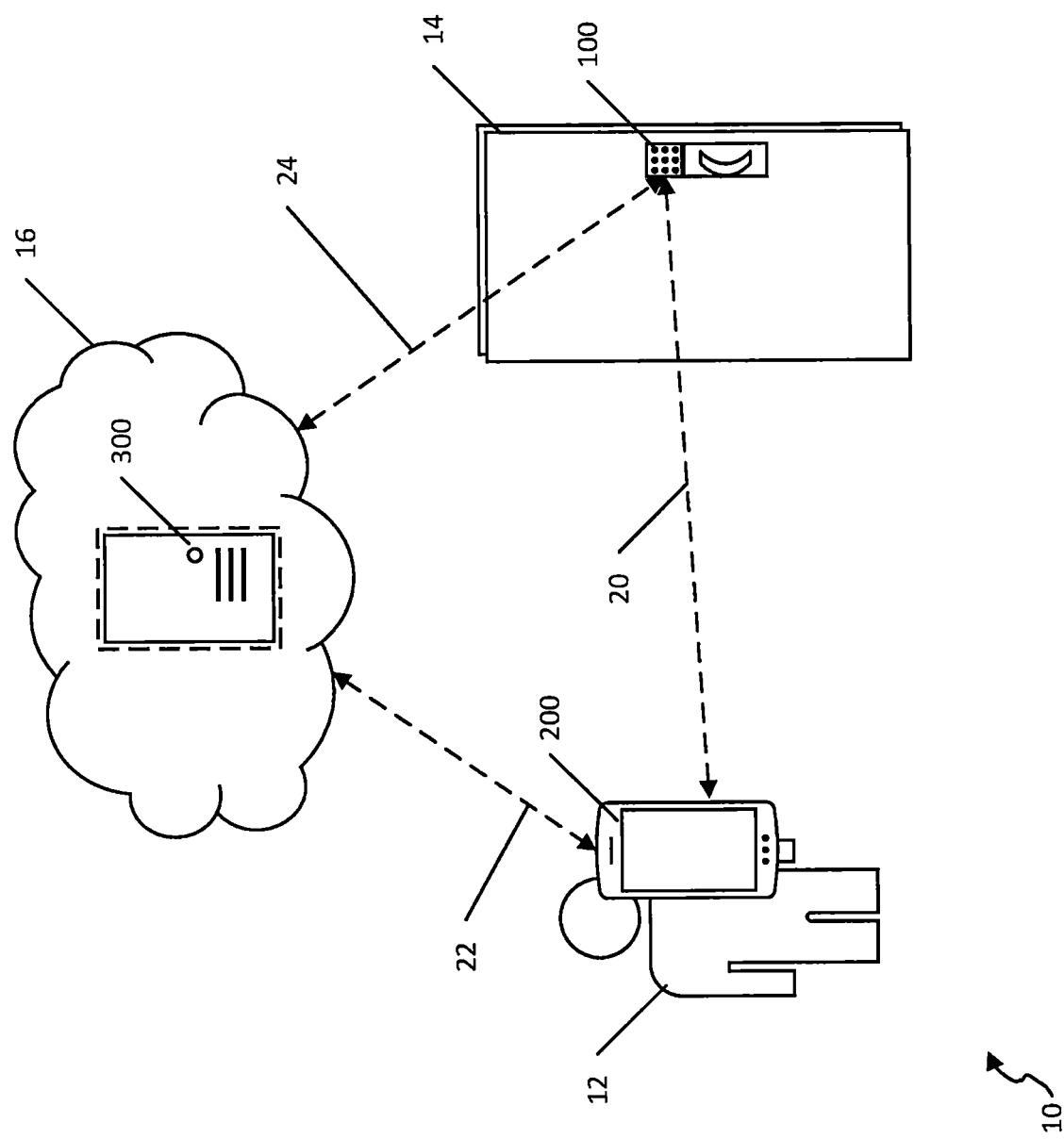
FIG. 1 illustrates an environment in which aspects of the present disclosure may be implemented.

As briefly described above, embodiments of the present invention are directed to features useable to actuate a wireless electronic lockset. A wireless electronic lockset includes a wireless communication tag that is operable to communicate with a mobile device via a first wireless protocol and/or a second wireless protocol. The wireless electronic lockset is configured to execute instructions to detect proximity of a mobile device to the wireless communication tag, sending a value stored in the wireless communication tag via a first wireless communication protocol to the mobile device using the first wireless communication protocol. The wireless electronic lockset receives an actuation command from the mobile device via a second wireless communication protocol to unlock or lock the lockset.

In example aspects, the first wireless protocol can be a short-range wireless protocol, such as using near-field communication (NFC), while the second wireless communication protocol can be a different wireless protocol, such as Bluetooth (e.g., Bluetooth Low Energy, or BLE). Other wireless protocols could be used as well, in other aspects.

In a particular example, the present disclosure relates to a wireless electronic lockset and associated mobile device and server system that enables a user to come into proximity to a wireless electronic lockset with their phone or electronic device (e.g., a mobile device) for the purposes of unlocking or locking a door. In an example embodiment, the mobile device would query a NFC tag incorporated into the lockset to acquire a value from the NFC tag. The mobile device would send the value to a key server for verification. If the key server verifies the value, then the mobile can issue an actuation command using a pre-established secure and authenticated connection, such as a Bluetooth connection, provided by the mobile device. This actuation command can result in the door unlocking or locking for the user and report the status back to the phone or electronic device.

The term "lock" or "lockset" is broadly intended to include any type of lock, including but not limited to deadbolts, knob locks, lever handle locks, mortise locks and slide locks, whether mechanical, electrical or electro-mechanical locks. The locking points may have various mounting configurations and/or locations, including but not limited to: mortised within the doorframe, mounted externally to the doorframe or support structure, and/or affixed directly to the door.

The interconnected system may have an unlimited number of locking points. In one embodiment, for example, a first lock may wirelessly communicate with a plurality of interconnected locks so that actuation of the first lock also actuates one or more of the other interconnected locks. For example, the plurality of interconnected locks may have a wireless communication feature that allows communication between locks. By way of example only, the wireless communication capability of the locks could use the Bluetooth wireless connection noted above, or in alternative embodiments, could also use the IEEE 802.11 standard, such as using Wi-Fi, or the IEEE 802.15.4 standard, such as using Zigbee, a cellular network, a wireless local area network, near-field communication protocol, or any other network protocols. Accordingly, the locks could communicate directly with a mobile device, or use a wireless gateway, and/or coordinate with other networking devices.

Although this disclosure describes these features as implemented on a deadbolt for purposes of example, these features are applicable to any type of lockset, including but not limited to deadbolts, knobset locks, handleset locks, etc.

FIG. 1 illustrates an environment 10 in which aspects of the present disclosure may be implemented. A user 12 has a phone or other mobile device 200 with wireless communication capabilities. The user 12 is an authorized person desiring to unlock (or lock) a door 14. The door 14 includes a wireless electronic lockset 100. The mobile device 200 is capable of communicating 22 with a key server 300 and communicating 20 with the wireless electronic lockset 100. The key server 300 can be, for example a physical server, or a virtual server hosted in a cloud storage environment 16. The wireless electronic lockset 100 is also capable of communicating 24 with the key server 300. Such communication can optionally occur via one or more wireless communication protocols, e.g., Wi-Fi (IEEE 802.11), short-range wireless, etc. The key server 300 stores the value (or key) used to authenticate the mobile device 200 when attempting to unlock the door 14.

Figure 2:
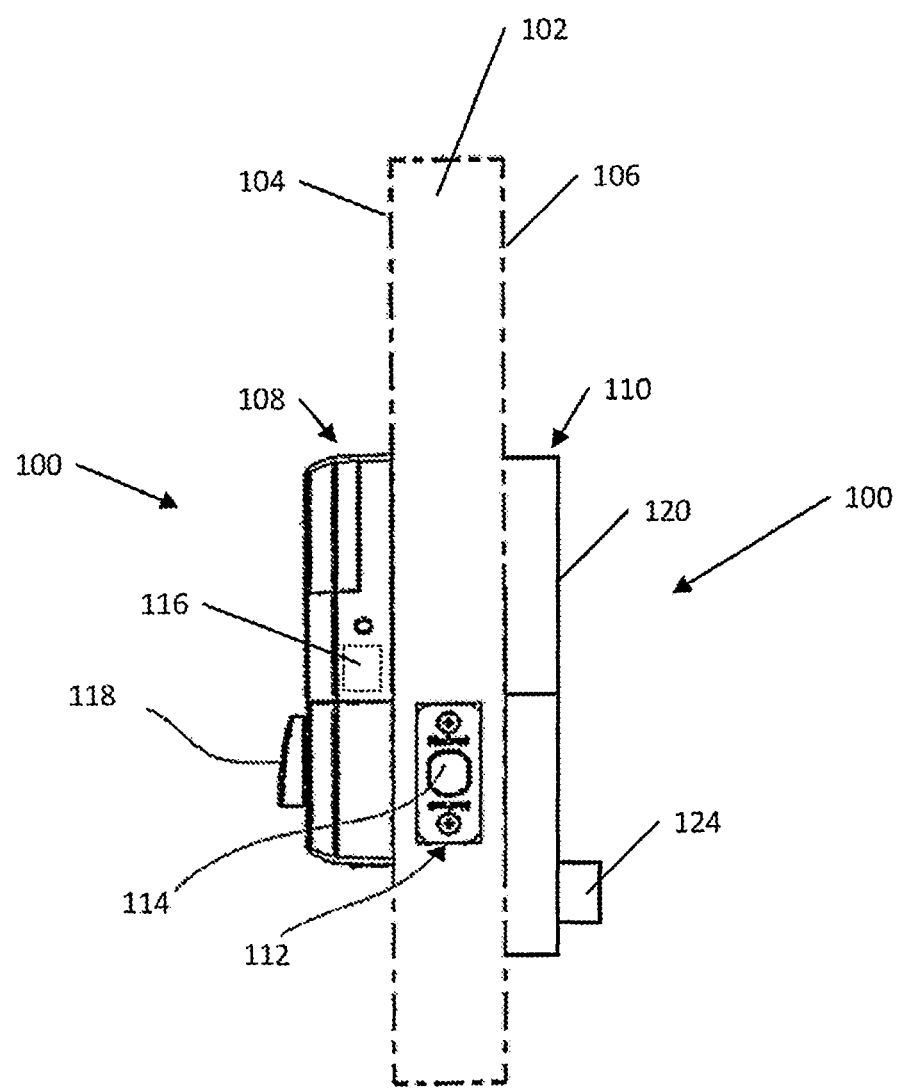
FIG. 2 illustrates a rear perspective view of a portion of the electronic lock of FIG. 1.
Figure 3:
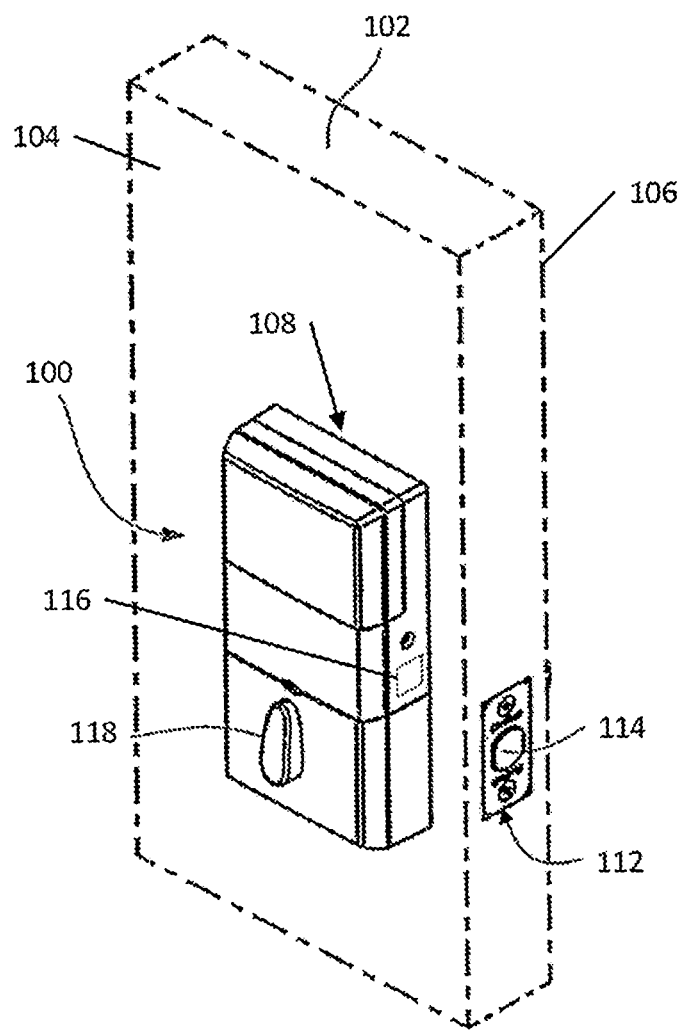
FIG. 3 illustrates a front perspective view of a portion of the electronic lock of FIG. 1.
Figure 4:
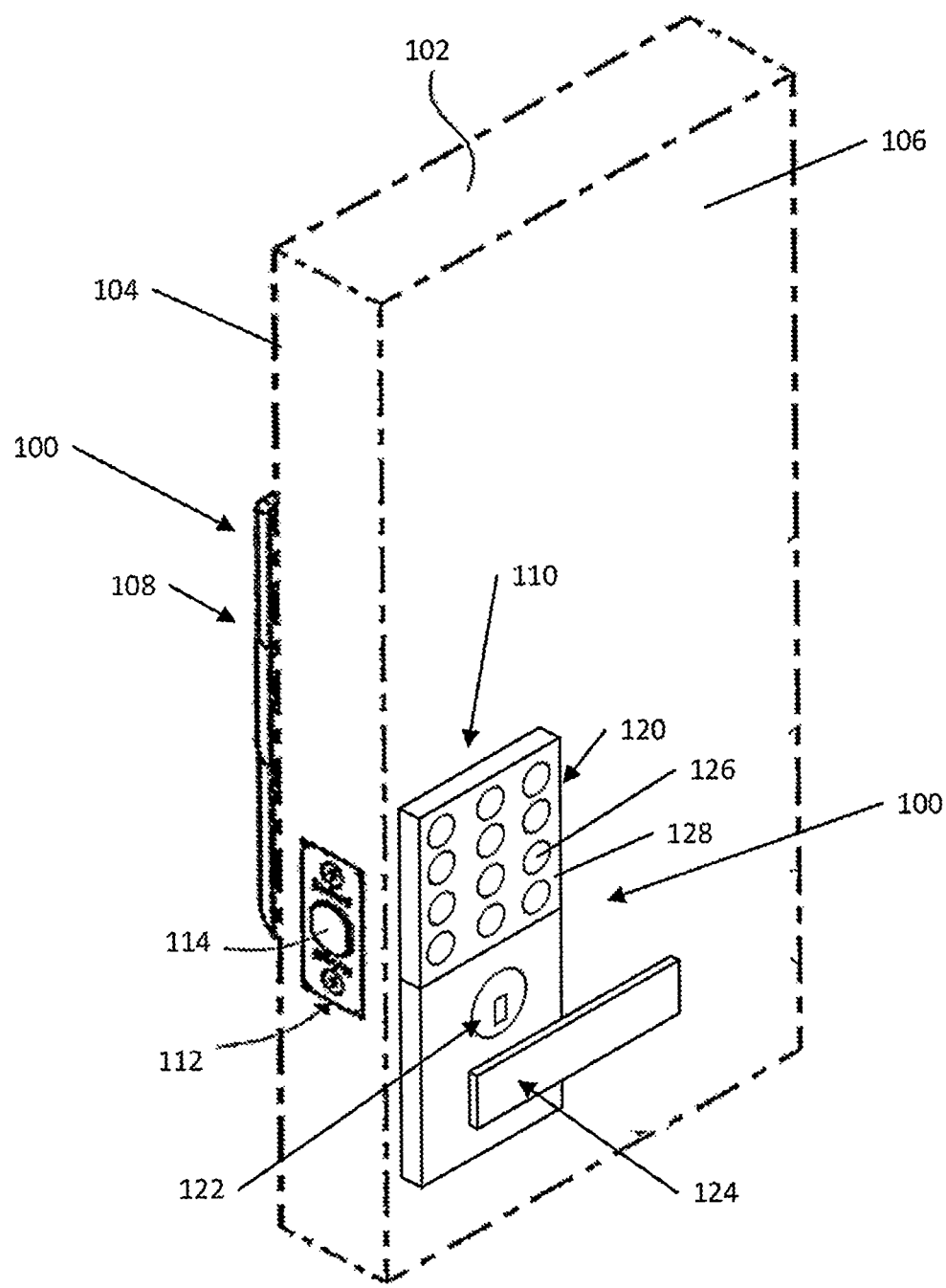
FIG. 4 illustrates a schematic representation of an example system utilizing the electronic lock of FIG. 1.

FIGS. 2-4 illustrate an electronic lock 100 (also referred to herein as a "wireless electronic lockset") mounted to a door 102, according to one example of the present disclosure. The door has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 102 is in an unlocked state. When the bolt 114 is extended, the bolt 114 protrudes from the door 102 into a door jamb (not shown) to place the door in a locked state.

In some examples, the interior assembly 108 is mounted to the interior side 104 of the door 102, and the exterior assembly 110 is mounted to the exterior side 106 of the door 102. The latch assembly 112 is typically at least partially mounted in a bore formed in the door 102. The term "outside" is broadly used to mean an area outside the door 102 and "inside" is also broadly used to denote an area inside the door 102. With an exterior entry door, for example, the exterior assembly 110 may be mounted outside a building, while the interior assembly 108 may be mounted inside a building. With an interior door, the exterior assembly 110 may be mounted inside a building, but outside a room secured by the lock 100, and the interior assembly 108 may be mounted inside the secured room. The lock 100 is applicable to both interior and exterior doors.

Referring to FIG. 3, the interior assembly 108 can include a processing unit 116 (shown schematically) containing electronic circuitry for the electronic lock 100. In some examples, the interior assembly 108 includes a manual turnpiece 118 that can be used on the interior side 104 of door 102 to move the bolt 114 between the extended and retracted positions.

The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device and may be embodied as a standalone unit or as a device shared with components of the electronic lock 100. The processing unit 116 may include memory communicatively interfaced to the processor, for storing the software instructions. Alternatively, or the electronic lock 100 may further comprise a separate memory device for storing the software instructions that is electrically connected to the processing unit 116 for the bi-directional communication of the instructions, data, and signals therebetween.

Referring to FIG. 4, the exterior assembly 110 can include exterior circuitry communicatively and electrically connected to the processing unit 116. For example, the exterior assembly 110 can include a keypad 120 for receiving a user input and/or a keyway 122 for receiving a key (not shown). The exterior side 106 of the door 102 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid code into the keypad 120, the bolt 114 is moved between the extended and retracted positions.

In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 102. When the user inputs a valid code via keypad 120 that is recognized by the processing unit 116, an electrical motor is energized to retract the bolt 114 of latch assembly 112, thus permitting door 102 to be opened from a closed position. Still further, an electrical connection between the exterior assembly 110 and the interior assembly 108 allows the processing unit 116 to communicate with other features included in the exterior assembly 110, as noted below The keypad 120 can be any of a variety of different types of keypads. The keypad 120 can be one of a numeric keypad, an alpha keypad, and/or an alphanumeric keypad. The keypad 120 can have a plurality of characters 126 displayed thereon. For example, the keypad 120 can include a plurality of buttons that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

Figure 5:
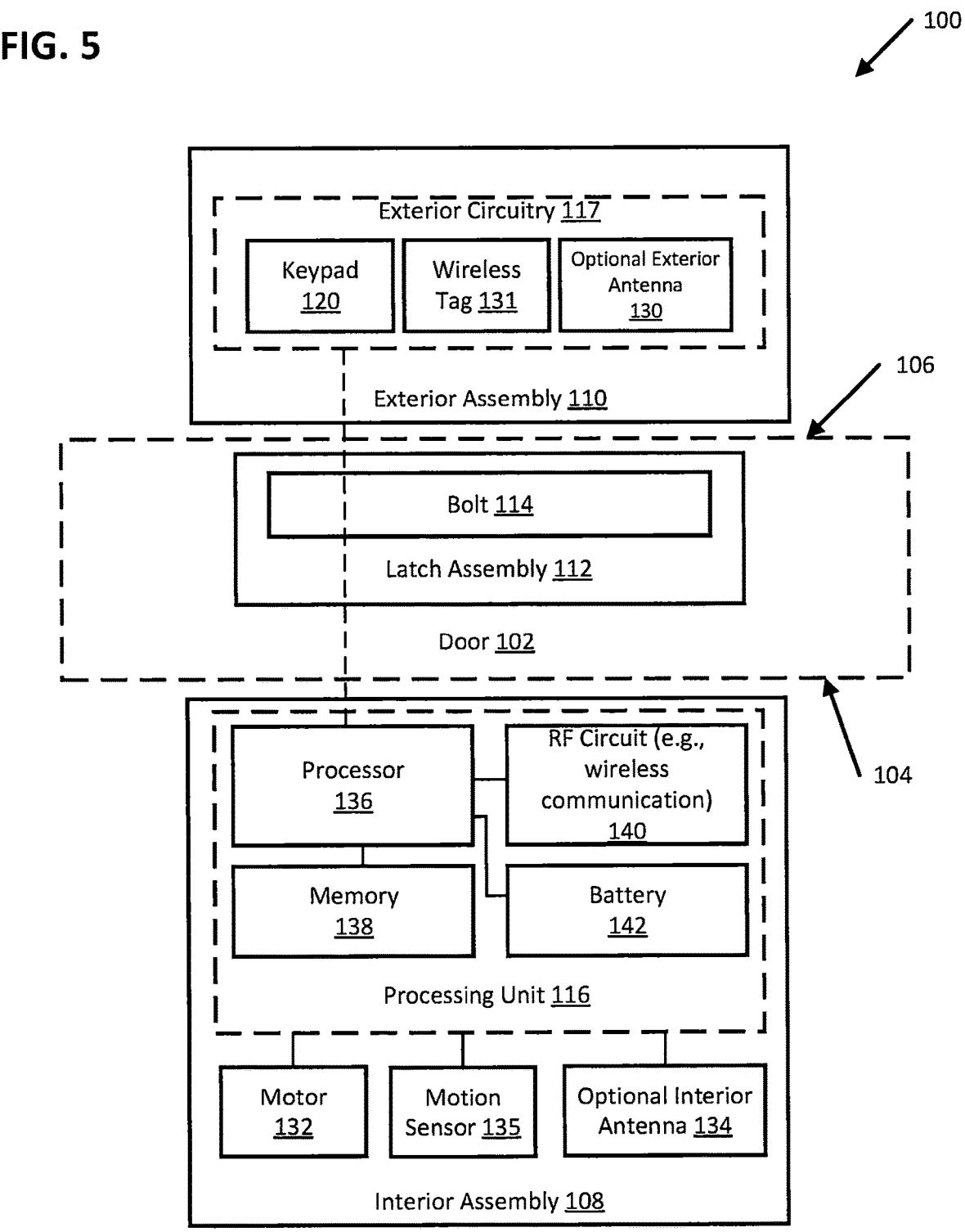
FIG. 5 illustrates a schematic representation of the electronic lock of FIG. 1.

FIG. 5 is a schematic representation of the electronic lock 100 mounted to the door 102. The interior assembly 108, the exterior assembly 110, and the latch assembly 112 are shown.

The exterior assembly 110 is shown to include the keypad 120 and an optional exterior antenna 130 usable for communication with a remote device.

The exterior antenna 130 is capable of being used in conjunction with an interior antenna 134, such that the processing unit 116 can determine where a mobile device is located. Only a mobile device 200 determined to be located on the exterior of the door is able to actuate (unlock or lock) the door. This prevents unauthorized users from being located exterior to the door 102 of the electronic lock and taking advantage of an authorized mobile device that may be located on the interior of the door, even though that authorized mobile device is not being used to actuate the door. However, such a feature is not required, but can add additional security.

As described above, the interior assembly 108 includes the processing unit 116. The interior assembly 108 can also include a motor 132 and an optional interior antenna 134.

As shown, the processing unit 116 includes a processor 136 communicatively connected to memory 138, an RF circuit 140, and a battery 142. The processing unit 116 is located within the interior assembly 108 and is capable of operating the electronic lock 100, e.g., by actuating a motor 132 to actuate the bolt 114.

In some examples, the processor 136 can process signals received from a variety of devices to determine whether the electronic lock 100 should be actuated. Such processing can be based on a set of preprogramed instructions (i.e., firmware) stored in the memory 138. In some examples, the processing unit 116 is configured to capture a keypad input event from a user and store the keypad input event in the memory 138. In other examples, the processor 136 receives a signal from the exterior antenna 130, interior antenna 134, or motion sensor 135 (e.g., a vibration sensor, gyroscope, accelerometer, motion/position sensor, or combination thereof) and can validate received signals in order to actuate the lock 100. In a particular embodiment, the processor 136 will receive a signal at the RF circuit 140 via a wireless communication protocol from a mobile device 200, which uses a protocol different from that communication protocol to receive a value from the electronic lock 100 for authentication. For example, in such an embodiment, the processor 136 can receive an actuation message from an authenticated mobile device 200 in response to the mobile device 200 receiving a key value from wireless tag 131 (e.g., an NFC tag value, as noted below).

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

In some examples, the processing unit 116 can include the RF circuit 140. The RF circuit 140 is capable of providing at least one wireless communication protocol. In some examples, the processing unit 116 can communicate with a remote device via the RF circuit 140. In some examples, the processing unit 116 can communicate with one or both of the mobile device 200 and key server 300 via the RF circuit 140. The RF circuit 140 can include one or more wireless communication interfaces, e.g., Bluetooth, Wi-Fi (IEEE 802.11x protocols), or any other wireless communication interface capable of bidirectional wireless communication. In example embodiments, the RF circuit 140 can include a Bluetooth Low Energy (BLE) interface.

In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment. Such communication may be facilitated, e.g., by the RF circuit 140.

The interior assembly 108 also includes the battery 142 to power the electronic lock 100. In one example, the battery 142 may be a standard single-use (disposable) battery. Alternatively, the battery 142 may be rechargeable.

The interior assembly 108 also includes the motor 132, which is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 102 is locked and the motor 132 receives a lock command, then no action is taken. If the door 102 is locked and the motor 132 receives an unlock command, then the motor 132 actuates the bolt 114 to unlock the door 102.

As noted above, the optional interior antenna 134 may also be located in the interior assembly 108. In some examples, the interior antenna 134 is capable of operating together with the exterior antenna 130 to determine the location of the mobile device 208. In some examples, only a mobile device determined to be located on the exterior side 110 of the door 102 is able to unlock (or lock) the door 102. This prevents unauthorized users from being located near the electronic lock 100 and taking advantage of an authorized mobile device that may be located on the interior side 108 of the door 102, even though the authorized mobile device is not being used to unlock the door 102. In alternative embodiments, a different user location system may be used, e.g., based on angle of arrival based location sensing, or other location presence sensing technologies (e.g., camera, proximity sensor, etc.)

Referring to FIGS. 2-5 generally, in example embodiments, the electronic lock 100 may be used on both interior and exterior doors. Described below are non-limiting examples of a wireless electronic lockset. It should be noted that the electronic lock 100 may be used on other types of doors, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

In a further example embodiment, the electronic lock 100 includes a touch activation capability, which can be used to initiate a process to lock/unlock the lock and/or otherwise provide input. In some embodiments, for example, the entire outside cover of the lock is touch sensitive and allows a user to touch the lock to activate various functions of the lockset. This capability is unique because it does not require any special keypad area, button press, or glass capacitive touch sensor area, but rather allows the entire diameter of the lockset cover to act as a capacitive touch sensor for activation.

Still referring to FIGS. 1-5 generally, and as further explained below, in example instances in which the wireless tag 131 is included in the exterior circuitry 117, the wireless tag 131 (e.g., an NFC tag) is responsive to a mobile device inquiry when a mobile device 200 is in close proximity to the electronic lock 100. Most mobile devices 200 come equipped with a NFC tag or the ability to communicate with other devices comprising a NFC tag. Other devices comprising NFC capabilities may be used to communicate with the electronic lock 100, such as a keycard, or other similar device. The wireless tag 131 communicates with the processing unit 116 of the electronic lock 100 to receive a value, and provides that value to a mobile device 200 in response to an inquiry from that mobile device. In example embodiments, the value can be an encrypted (hashed) key useable by the mobile device to validate that the mobile device is authorized to actuate the lock.

In use, the wireless tag 131 can be interrogated by a mobile device 200 when the mobile device is in close proximity; as such, in many cases, a user will ensure such close proximity with a gesture while holding the mobile device, e.g., by tapping the mobile device against an exterior portion of the electronic lock 100 that houses the wireless tag 131. Accordingly, the tap will, by ensuring the mobile device is an adequately-close distance from the wireless tag 131, trigger a scan of the wireless tag 131 and read of its contents, spurring a mobile application installed on the mobile device to initiate actuation of the electronic lock 100 in accordance with the processes outlined below in conjunction with FIGS. 6-8.

The processing unit 116 stores the value that the wireless tag 131 sends to the mobile device 200, and can periodically update that value to provide additional security. The processing unit 116 can further transmit the value (or in the case of a hashed key, the original key) to the key server 300, so that a mobile device 200 having an appropriate application installed thereon and receiving the value can compare the received value to a value maintained at the server 300 for validation. The value can be changed at regular or irregular intervals, or upon prompting by a user 12. For example, the value can be changed every day, once a week, once a month, or at other intervals. Alternatively, if the value has been compromised, the user 12 can request that the value be changed. Such a changed value can be initiated by the processing unit 116 and communicated to the key server 300 and wireless tag 131, or initiated at the key server 300 and transmitted to the processing unit 116 for writing to the wireless tag 131.

In example embodiments, and as noted below, the processing unit 116 can request a value from the server 300 for comparison, or can transmit the value received at the mobile device 200 from the wireless tag 131 to the server 300, with the server responding with a validation message to the mobile device 200 upon successful comparison of values. In example embodiments, the wireless tag 131 may be either a passive or active device. Preferably, the wireless tag 131 is an active device capable of receiving data written to it by processing unit 116, to allow for changed values as noted above. In some example circumstances, the wireless tag 131 is capable of being written to by the mobile device 200 as well, for example allowing the mobile device to write a specific authentication code to the wireless tag, which either the mobile device can transmit to the key server 300, or the processing unit 116 can read from the tag and transmit to the key server.

In embodiments, other wireless protocols may be utilized to send values to a mobile device 200. For example, the electronic lock 100 may utilize Wi-Fi or Bluetooth wireless protocols to communicate with the mobile device 200. Still further, a combination of these wireless communication protocols may be used. In a particular embodiment, as noted above, the exterior antenna 130 can be used in connection with a Bluetooth Low Energy (BLE) wireless communication protocol, to allow for a second wireless connection to a mobile device in addition to the NFC tag.

In still further example embodiments, the electronic lock 100 can include integrated motion sensor 135. Using such a motion sensor (e.g., an accelerometer, gyroscope, or other position or motion sensor) and wireless capabilities of a mobile device or an electronic device (i.e. fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200 in proximity to the electronic lock 100.

Of course, in alternative embodiments, other lock actuation sequences may not require use of a motion sensor 135. For example, if the mobile device 200 is in valid range of the electronic lock 100 when using a particular wireless protocol (e.g., Bluetooth Low Energy), then a connection will be established with the electronic lock 100. Still further, if the mobile device 200 is in valid range of the electronic lock 100 when using a different wireless protocol (e.g., NFC), the mobile device 200 will request a value from the electronic lock 100, and can perform a validation such that the mobile device 200 can transmit a lock actuation command using the particular wireless protocol.

In another example embodiment, the RF circuit 140 communicates with a router via Wi-Fi to ultimately communicate with the key server 300. The router may be standard router connected to a network, located within the building. The RF circuit 140 receives the value to be send through the wireless tag 131 from the key server 300 via a Wi-Fi protocol. Alternatively, the RF circuit 140 may communicate with a router through a Zigbee communication protocol. Still further, the RF circuit 140 may communicate with a router through a Bluetooth communication protocol.

Figure 6:
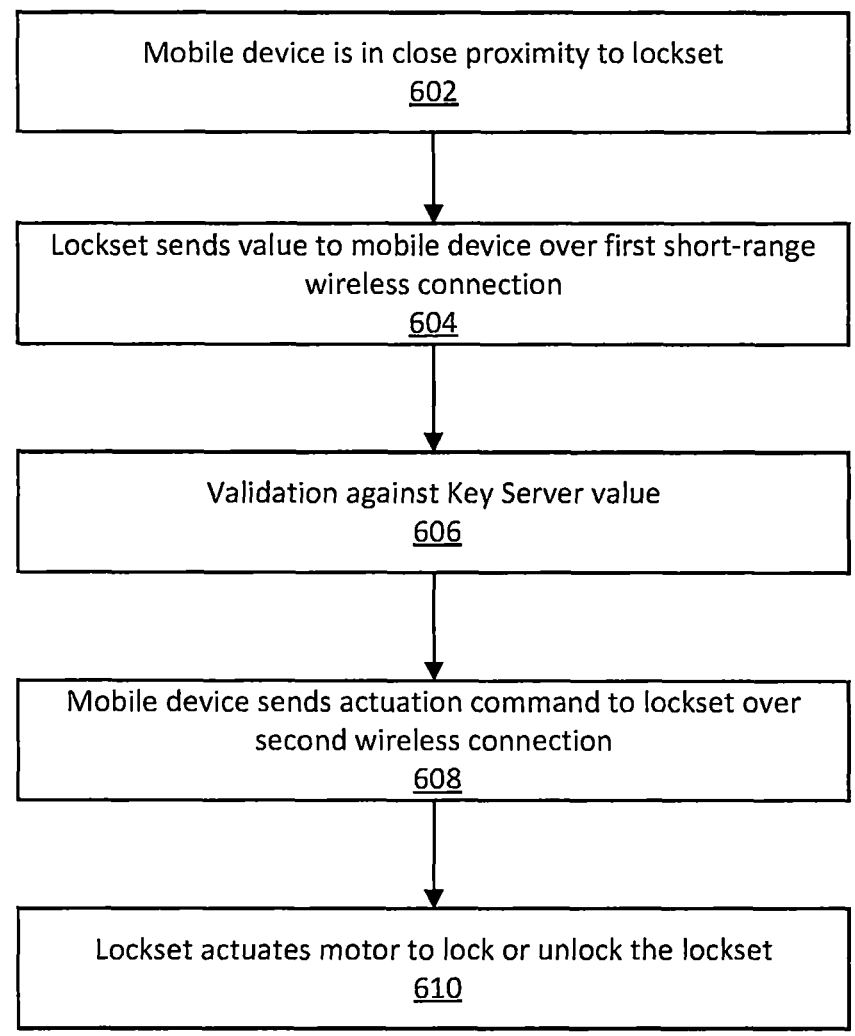
FIG. 6 is a simplified block diagrams of method of wirelessly actuating a lockset performed using a mobile device and a wireless electronic lockset, according to an example embodiment.

FIG. 6 is a flowchart of a method 600 for utilizing a mobile device 200 to unlock or lock an electronic lock, such as the electronic lock 100 described above. In the embodiment shown, the method 600 includes, at 602, a mobile device 200 being associated with the electronic lock 100 brought into close proximity to a wireless electronic lockset. In an example embodiment, the mobile device is within close proximity to the wireless electronic lockset when it is within communication range using a short-range wireless protocol, such as near field communication (NFC), e.g., within 4 inches. Alternatively, the mobile device may be touching or nearly touching the wireless electronic lockset.

At 604, once the wireless electronic lockset is queried by the mobile device, a value is sent to the mobile device. The value sent to the mobile device may utilize a wireless communication protocol. In an example embodiment, NFC is used to transmit a value from the wireless tag 131 to the mobile device. Alternatively, other wireless communication protocols, such as RFID, Bluetooth, or Wi-Fi (e.g., IEEE 802.11x) may be used to transmit a value from the wireless electronic lockset to a mobile device. The value transmitted can be, for example, a shared key generated according to a elliptic curve Diffie-Hellman encryption scheme, or a hashed version thereof. In alternative embodiments, the value comprises a random value written to the wireless tag 131 and sent to the key server 300 periodically, to ensure the lock encoding is not duplicated, thereby enhancing security.

At 606, the value sent to the mobile device 200 is validated against a value that is stored at the key server 300 to determine if the mobile device 200 is authorized to actuate the electronic lock 100. In an example embodiment, the mobile device 200 transmits the value to the key server 300 via a cellular or Wi-Fi connection. The mobile device 200 may include an application installed thereon which allows for such communication only if a user 12 has successfully associated his/her mobile device 200 with the electronic lock 100 at the key server 300.

In an example implementation, the mobile device 200 transmits to the key server 300 both user credentials (e.g., a username, password, certificate, or other identification) and the received value, and the key server both (1) compares the received value to a pre-stored value (also received from the electronic lock 100) and (2) determines that the user credentials are associated with the lock from which the value was received. Accordingly, the key server 300 confirms that the mobile device is authorized to actuate the door. In such an implementation, after the value and device is validated by the key server, the server communicates this to the mobile device.

In a further example implementation, the mobile device 200 can transmit to the key server 300 user credentials, and receives in response a value from the key server for comparison at the mobile device 200 between the value from the key server and a value received from the wireless tag 131. In such an implementation, an application installed on the mobile device will determine whether that mobile device is authorized to actuate the lock.

Once the mobile device credentials and value are authenticated, at 608, the mobile device sends an actuation command to the wireless electronic lockset. An actuation command may be a command to unlock the lockset or the lock the lockset, whichever is opposite the current state of the lockset. The actuation command is sent via a wireless protocol that may be the same or different wireless protocol used to send the value to the mobile device initially. Example wireless protocols may be Bluetooth or Wi-Fi (e.g., IEEE 802.11x).

At 610, after the wireless electronic lockset receives the actuation command, the wireless electronic lockset actuates a motor to lock or unlock the wireless electronic lockset. In an embodiment, the wireless electronic lockset remains unlocked until the wireless electronic lockset receives a subsequent command to lock the lockset. In another embodiment, the wireless electronic lockset remains unlocked for a predetermined period of time before actuating back to a locked state.

Figure 7:
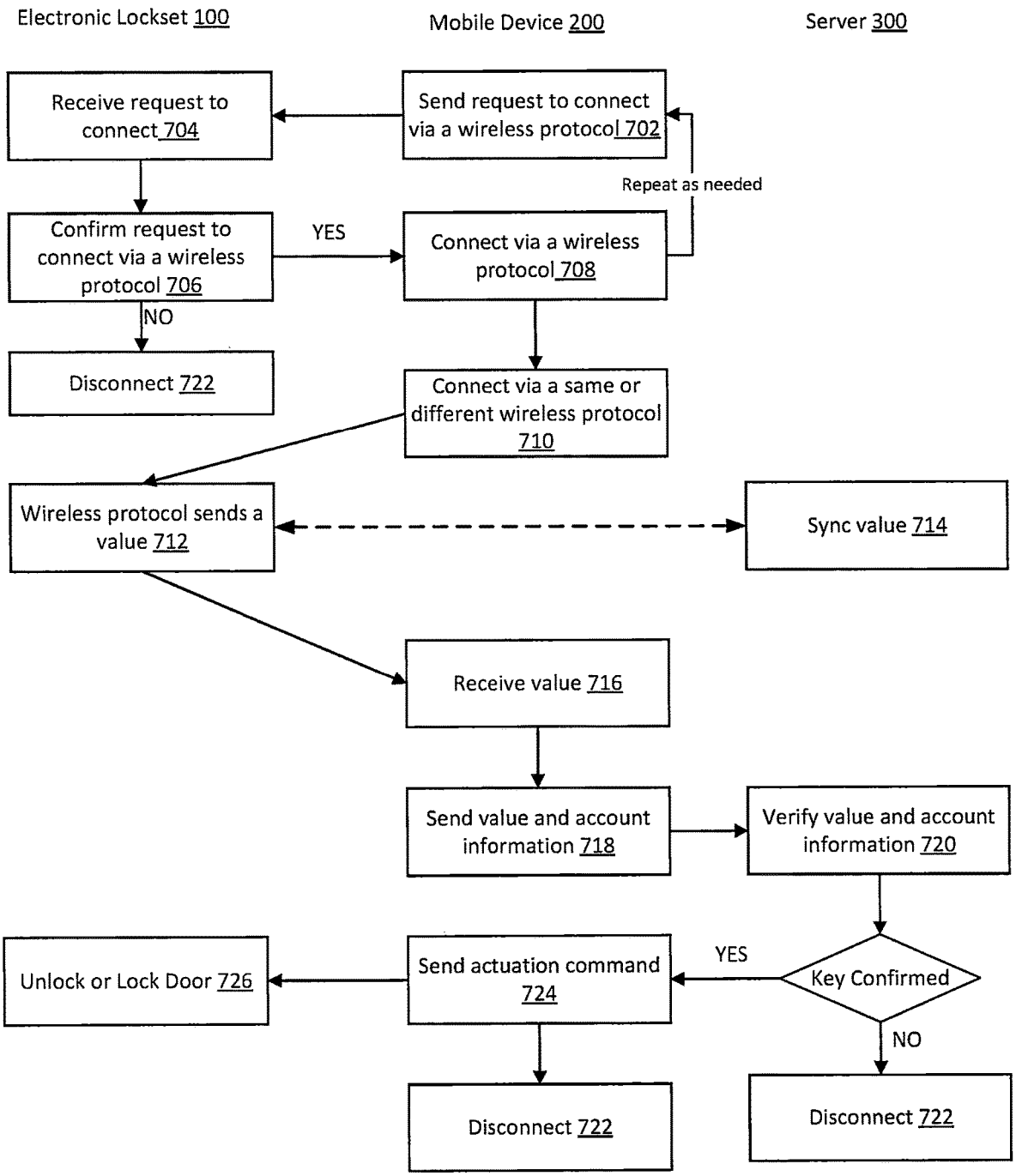
FIG. 7 is a flowchart of a method of wirelessly actuating a lockset performed using a mobile device and a wireless electronic lockset, according to an example embodiment.
Figure 8:
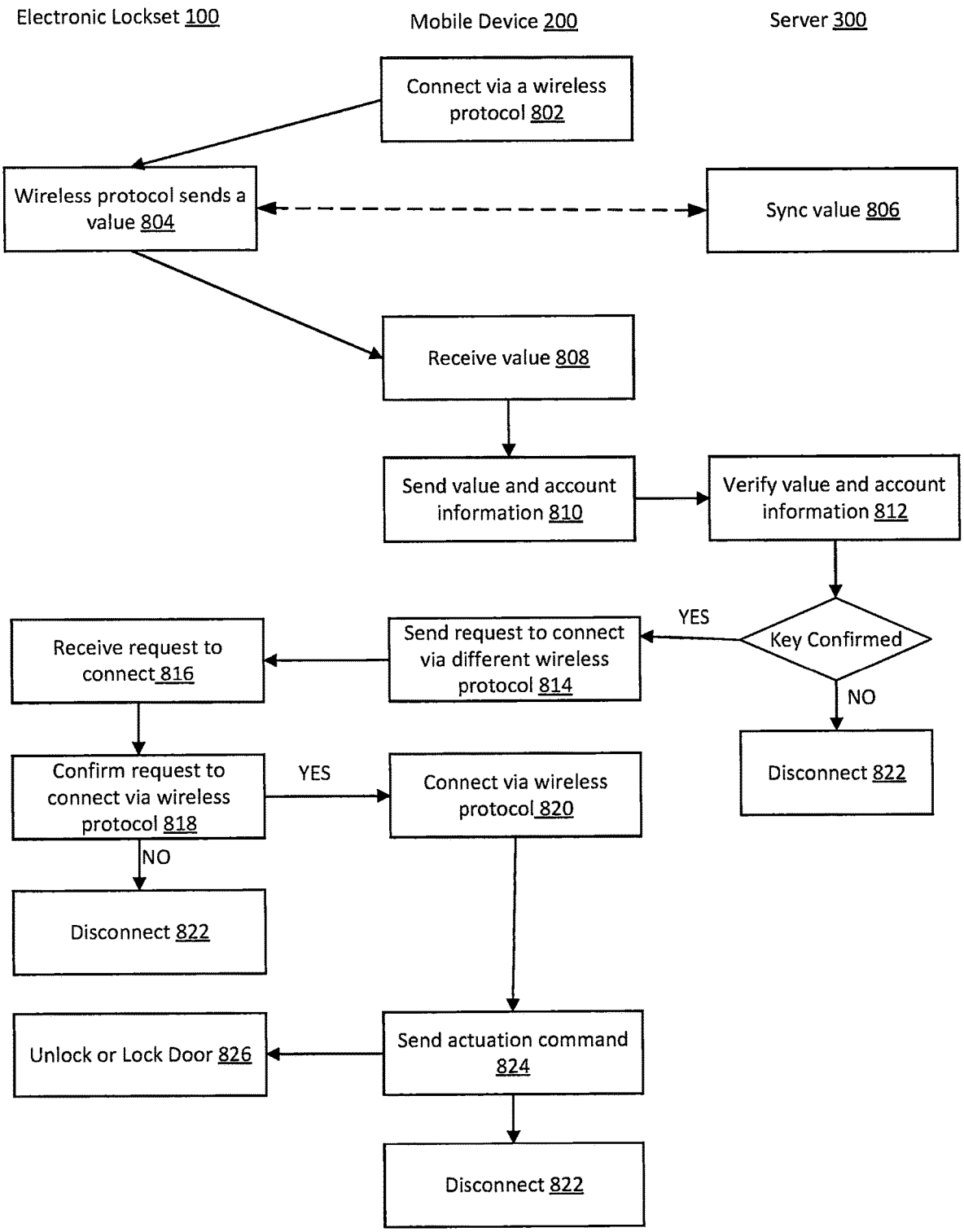
FIG. 8 is a flowchart of a method of wirelessly actuating a lockset performed using a mobile device and a wireless electronic lockset, according to an example alternative embodiment.

Referring now to FIGS. 7-8, specific operational sequences for actuation of an electronic lock 100 are provided, in which an NFC tag is used to transmit a value to a mobile device 200, and, once authenticated, the mobile device 200 transmits an actuation command to the electronic lock 100.

FIG. 7 is a flowchart of a method 700 of validating a user desiring to actuate a lock performed using a mobile device 200, an electronic lock 100, and a key server 300, according to an example embodiment. In the example shown, at 702, the mobile device 200 requests to connect to the electronic lock 100 via a first wireless protocol. At 704, the wireless electronic lockset receives the request and either accepts or rejects the request. At 706, the wireless electronic lockset confirms the request to connect from the mobile device via the first wireless protocol. Accordingly, the electronic lock 100 and mobile device 200 are connected via the first wireless protocol. The process can be repeated as necessary, for example, each time the mobile device 200 is in close proximity to the electronic lock 100, or for any communication protocol for which communication is desired.

By way of example only, and as noted above, the wireless communication capability of the locks could use the IEEE 802.11 standard, such as using Wi-Fi, or the IEEE 802.15.4 standard, such as using Zigbee, the IEEE 802.15.1 standard, such as Bluetooth, a cellular network, a wireless local area network, near-field communication protocol, or other network protocols. In an exemplary embodiment, the first wireless protocol is a Bluetooth communication protocol, such as Bluetooth Low Energy (BLE).

At 710, the mobile device 200 connects to the electronic lock 100 via a second wireless protocol. In an example, the second wireless protocol is the same wireless protocol as the first wireless protocol. However, in another example, the second wireless protocol is a different wireless protocol than the first wireless protocol. The wireless protocol could be the IEEE 802.11 standard, such as using Wi-Fi, or the IEEE 802.15.4 standard, such as using Zigbee, the IEEE 802.15.1 standard, such as Bluetooth, a cellular network, a wireless local area network, near-field communication protocol, or other network protocols. In a particular embodiment, the second wireless protocol corresponds to a short-range wireless protocol having a range less than the first wireless protocol. For example, the second wireless protocol can be implemented using a near-field communication (NFC) protocol, and communication is initiated based on the mobile device 200 being brought into close proximity to wireless tag 131.

At 712, the electronic lock 100 sends a value to the mobile device 200 via the second wireless protocol. For example, the value can be a value programmed into the wireless tag 131 of the electronic lock 100. As noted above, in examples, the value can be a random value periodically encoded in the wireless tag 131 and transmitted to the key server 300 for validation of the mobile device; in alternative embodiments, the value can be a symmetric key value, such as can be generated using an elliptic curve Diffie-Hellman encryption scheme. Other values are possible as well.

At 714, the electronic lock 100 also synchronizes the value with the key server. For example, in one implementation, as noted above, the electronic lock 100 generates the value to be stored in the wireless tag 131 and transmits the value to the key server 300. In another implementation, the key server generates the value for the electronic lock 100, for storage in the wireless tag 131.

At 716, the mobile device 200 receives the value from the wireless electronic lockset and, at 718, the mobile device 200 sends that value to the server 300. As noted above, in some implementations, the mobile device 200 also sends account information to the server. This account information can include, for example, information that has previously associated the mobile device 200 with the electronic lock 100. In an example, account information includes information that the server may use as a validation that the mobile device 200 sending the value is a mobile device authorized to receive the value and open the door 102. For example, an application may include credential information such as a user identification and a password, or a certificate.

Although it is noted above that the mobile device 200 may perform authentication by requesting a copy of the value from the key server 300, in embodiments where the mobile device transmits the value and credential information to the key server, security is enhanced by avoiding a circumstance in which the mobile device has access to the value at both the lock 100 and server 300. For example, if the value stored in the tag 131 is a hash of the value stored at the server 300, the server can easily validate the mobile device by comparing a hash of its stored value to the received value from the mobile device, which was previously hashed prior to storage in the wireless tag 131.

Accordingly, at 720, the key server 300 verifies that the value sent by the mobile device 200 and the value previously received from the electronic lock 100 are the same and that the account information has been verified. If the values and account information are not confirmed, the server does not send authorization to the mobile device 200, and the mobile device will, either upon receiving a notice of rejection or after a predetermined period of time, disconnect from the wireless electronic lockset 110. However, if the values and the account information are confirmed, at 724, the key server 300 authorizes the mobile device 200 to send an actuation command to the electronic lock 100. The mobile device 200 receives the authorization message and transmits an actuation command to the electronic lock 100, which accordingly unlocks or locks the door at 726.

After the actuation command is sent, at 722, the mobile device 200 disconnects from the electronic lock 100 with respect to the connection established using the first communication protocol (i.e., the communication protocol used to transmit the actuation command).

In optional embodiments, additional operations (not shown) may be performed by one or both of the electronic lock 100 or mobile device 200. For example, a logging operation may be performed to record the lock actuation attempt, and result of lock actuation (including the time, the authorized device or device attempting actuation, and result of the actuation operation). Still further, a remote notification message may be transmitted from the electronic lock 100 to a remote device, e.g., the key server 300 or other device which may trigger transmission of a message (e.g., email, SMS text message, etc.) to a user having account information associated with the electronic lock 100, for confirmation or notification that an actuation attempt or actuation occurred.

FIG. 8 is a flowchart of an alternative method 800 of validating a mobile device 200 being used to open a door 102 with an electronic lock 100. In the example shown, at 802, the mobile device 200 connects to the electronic lock 100 via a short-range wireless protocol 602. In an example, the wireless protocol could be the IEEE 802.11 standard, such as using Wi-Fi, or the IEEE 802.15.4 standard, such as using Zigbee, the IEEE 802.15.1 standard, such as Bluetooth, a cellular network, a wireless local area network, near-field communication protocol, or other network protocols. In an exemplary embodiment, the first wireless communication protocol is NFC.

At 804, the electronic lock 100 sends a value to the mobile device 200 via the wireless protocol 604. As in FIG. 7, at 806, the electronic lock 100 also synchronizes the value with the key server, for example by either (1) transmitting an original key to the key server 300 and programming the wireless tag 131 with a hashed version of the key, or (2) receiving a hashed version of a key generated at the key server for programming into the wireless tag 131.

At 808, the mobile device 200 receives the value from the wireless electronic lockset and sends that value to the key server 610 for validation. As in FIG. 7, in certain embodiments, at 810, the mobile device also sends account information to the server, which can include information that has previously associated the mobile device 200 with the electronic lock 100. In an example, account information includes information that the server 300 may use as a validation that the mobile device 200 sending the value is a mobile device 200 authorized to receive the value and open the door 102.

At 812, the key server 300 verifies that the value sent by the mobile device 200 and the value previously received from the electronic lock 100 correspond to each other (e.g., the values match, or one is a hash of the other, or both are hash values of a common value), and that the account information has been verified. If the values and account information are confirmed, at 814, the mobile device 200 sends a request to connect to the electronic lock 100 via a particular communication protocol.

At 816, the electronic lock 100 receives the request to connect, and either accepts or rejects the request. If the wireless electronic lockset 110 confirms the request to connect from the mobile device 200, at 818, it connects via the wireless protocol. At 820, the electronic lock 100 and mobile device 200 establish a connection via the wireless protocol. By way of example only, the wireless communication capability of the locks could use the IEEE 802.11 standard, such as using Wi-Fi, or the IEEE 802.15.4 standard, such as using Zigbee, the IEEE 802.15.1 standard, such as Bluetooth, a cellular network, a wireless local area network, near-field communication protocol, or other network protocols. In an exemplary embodiment, the particular wireless protocol used to connect at 820 is Bluetooth.

At 822, if the values and account information are not confirmed, the mobile device 200 disconnects from the electronic lock 100. However, once the value and the account information are confirmed, at 824, the key server 130 authorizes the mobile device 200 to send an actuation command to the electronic lock 100. At 826, the electronic lock 100 receives the actuation command and unlocks or locks the door. After the actuation command is sent, at 822, the mobile device 200 disconnects from the electronic lock 100.

Comparing the example embodiments of FIGS. 7-8, it can be seen that an order in which the electronic lock 100 and mobile device 200 establish connections according to a first communication protocol and a second, short-distance communication protocol may vary; in FIG. 7, the electronic lock 100 and mobile device 200 establish a wireless connection with which data can be exchanged between those devices prior to transmission of the value from the electronic lock to the mobile device using the short range wireless protocol. However, in FIG. 8, any pre-established wireless connection according to a different wireless protocol is not formed until at least after the wireless tag 131 is read by the mobile device 200. Accordingly, read of the wireless tag 131 can trigger connection via a different wireless protocol (e.g., BLE), thereby conserving power at the electronic lock 100 by avoiding unnecessary connection sequences between the mobile device and lock when an NFC actuation sequence is not initiated.

Referring to FIGS. 1-8 generally, and as mentioned previously, the mobile device 200 may also include an application that stores user information and is capable of communicating with the electronic lock 100 and key server 300. A user has an account, which includes credential information to associate that mobile device 200 (or user log-in) with the electronic lock 100. The application is capable of communicating with the received value from the first wireless communication protocol (i.e., NFC) and authenticating the value with the value stored at the key server 300. The application contains credentials associated with the user, such as a username and password, which the server uses to authenticate the user as an authorized user. When the key server 300 authenticates the value received by the mobile device 200, the key server 300 also authenticates that the value was sent from a mobile device 200 with the application that has the correct user credentials. Once this authentication process is complete, the application sends an actuation command to the electronic lock 100 to unlock or lock the door 102.

The application prevents unauthorized users from opening the door 102. For example, an unauthorized user may tap the electronic lock 100 and receive the key from the wireless tag 131, but without the correct credentials the application does not receive an unlock command from the key server 300, or may even be prevented from connecting to the key server 300 entirely.

Figure 9A:
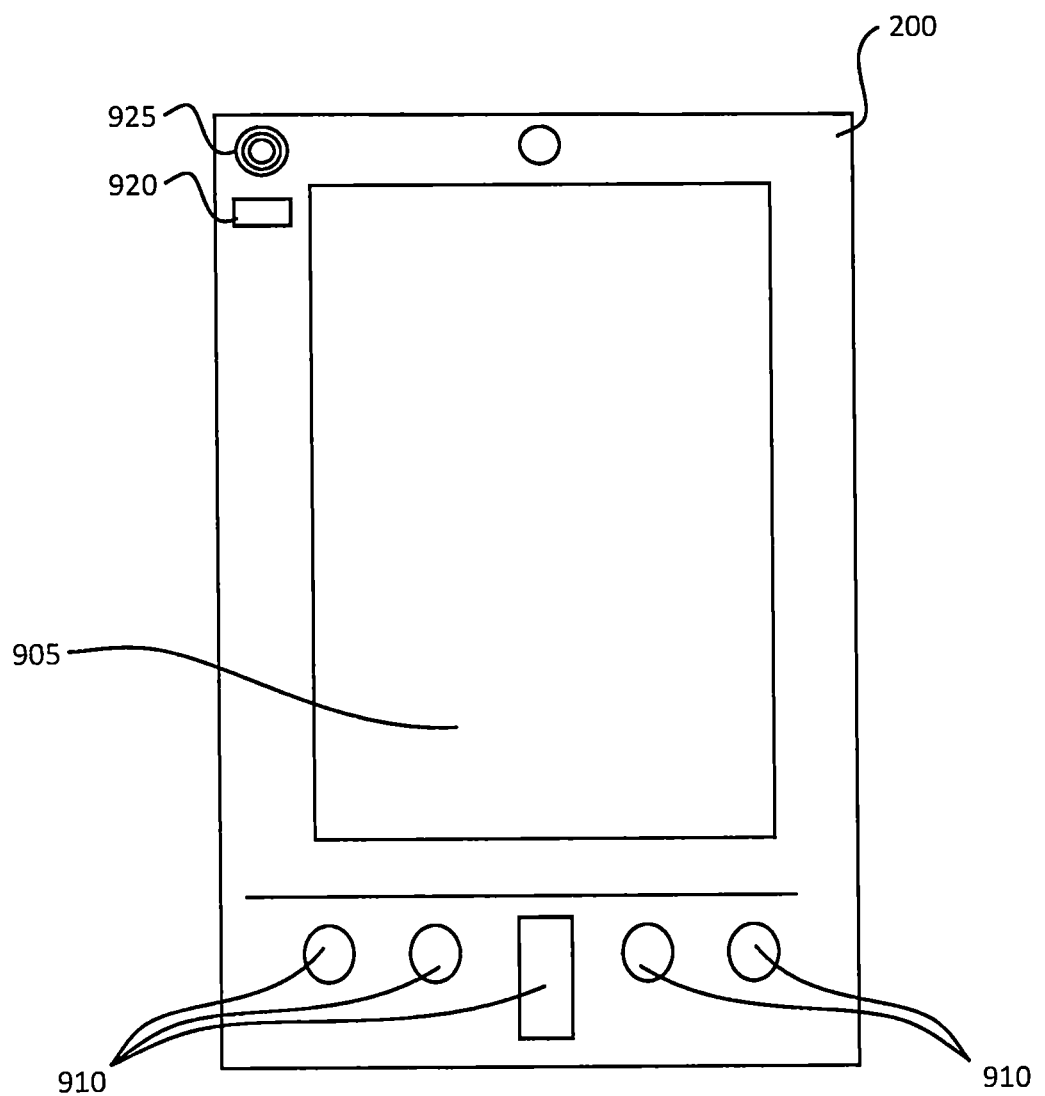
FIGS. 9A and 9B are simplified block diagrams of a mobile computing device with which aspects of the present disclosure may be practiced.
Figure 9B:
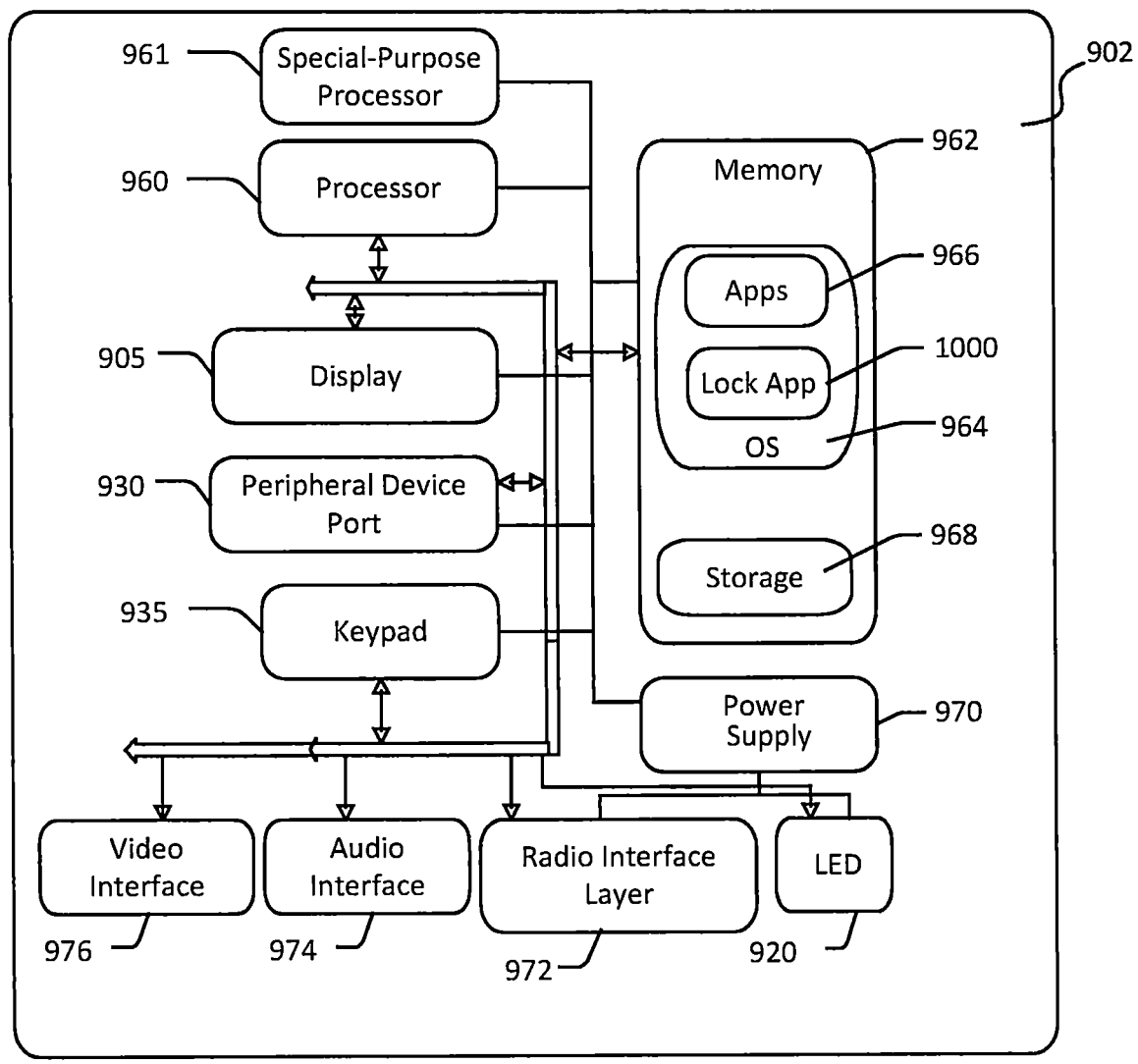

FIGS. 9A and 9B illustrate a mobile device 200, for example, a mobile telephone, a smart phone, wearable computer (such as a smart watch), a tablet computer, a laptop computer, and the like, with which embodiments of the disclosure may be practiced. With reference to FIG. 9A, one aspect of a mobile device 200 for implementing the aspects is illustrated. The mobile device 200 typically includes a display 905 and one or more input buttons 910 that allow the user to enter information into the mobile computing device 200. In various embodiments, the output elements include the display 905 for showing a graphical user interface (GUI), a visual indicator 920 (e.g., a light emitting diode), and/or an audio transducer 925 (e.g., a speaker). In an aspect, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIGS. 9A and 9B illustrate a mobile computing device 200, for example, a mobile telephone, a smart phone, a tablet personal computer, a laptop computer, and the like, with which embodiments of the invention may be practiced. With reference to FIG. 9A, one embodiment of a mobile computing device 200 for implementing the embodiments is illustrated. In a basic configuration, the mobile computing device 200 is a handheld computer having both input elements and output elements. The mobile computing device 200 typically includes a display 905 and one or more input buttons 910 that allow the user to enter information in the mobile computing device 200. The display 905 of the mobile computing device 900 may also function as an input device (e.g., a touch screen display). If included, an optional side input element 915 allows further user input. The side input element 915 may be a rotary switch, a button, or any other type of manual input element. In alternative embodiments, mobile computing device 900 may incorporate more or less input elements. For example, the display 905 may not be a touch screen in some embodiments. In yet another alternative embodiment, the mobile computing device 200 is a portable phone system, such as a cellular phone. The mobile computing device 200 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some embodiments, the mobile computing device 200 incorporates a vibration transducer for providing the user with tactile feedback. In yet another embodiment, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 200 can incorporate a system (i.e., an architecture) 902 to implement some embodiments. In one embodiment, the system 902 is implemented as a "smart phone" capable of running one or more applications (e.g., browser, e-mail, calendaring, contact managers, messaging clients, games, and media clients/players). In some embodiments, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968.

As should be appreciated, various applications may be loaded into the memory 962 and run on the mobile computing device 200, including a wireless lock control application 1000, operation of which is described herein.

The system 902 has a power supply 970, which may be implemented as one or more batteries. The power supply 970 might further include an external power source, such as an AC adapter or a powered docking cradle that supplements or recharges the batteries.

The system 1002 may also include a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa. Radio 972 can be implemented using one or more wireless communication frequencies and/or protocols, as outlined above in connection with FIGS. 1-8. In certain embodiments, Radio 972 represents a plurality of wireless radio interfaces useable for data communications.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present invention, the microphone may also serve as an audio sensor to facilitate control of notifications, as will be described below. The system 902 may further include a video interface 976 that enables an operation of an on-board camera 930 to record still images, video stream, and the like.

A mobile computing device 200 implementing the system 902 may have additional features or functionality. For example, the mobile computing device 200 may also include additional data storage devices (removable and/or non-removable) such as, magnetic disks, optical disks, or tape. Such additional storage is illustrated in FIG. 9B by the non-volatile storage area 968. Additionally, and in accordance with some example embodiments, the mobile computing device 200 can include a wireless tag reader. Such a wireless tag reader can be represented via radio 972, above, and can be one of a plurality of wireless communication interfaces present within the mobile computing device 200.

Data/information generated or captured by the mobile computing device 200 and stored via the system 202 may be stored locally on the mobile computing device 200, as described above, or the data may be stored on any number of storage media that may be accessed by the device via the radio 972 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 9A and 9B are described for purposes of illustrating the present methods and systems and is not intended to limit the disclosure to a particular sequence of steps or a particular combination of hardware or software components.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A wireless electronic lockset comprising:
a processing unit;
a locking bolt movable between a locked and unlocked position;
a motor actuatable by the processing unit to move the locking bolt between the locked and unlocked positions;
a wireless communication tag operable using a first wireless communication protocol; and
a wireless interface communicatively connected to the processing unit, the wireless interface configured to communicate using a second wireless communication protocol different from the first wireless communication protocol;
wherein the wireless electronic lockset is configured to execute instructions to perform:
in response to detecting proximity of a mobile device to the wireless communication tag, sending a value stored in the wireless communication tag via the first wireless communication protocol to the mobile device using the first wireless communication protocol;
in response to validation of the mobile device based on the received value, receiving, via the second wireless communication protocol, an actuation command;
in response to receipt of the actuation command, actuating the motor to move the locking bolt between the locked and unlocked positions;
in response to actuating the motor, updating a status of the wireless electronic lockset; and
in response to updating the status of the wireless electronic lockset, disconnecting via the first communication protocol, the mobile device from the wireless electronic lockset.

2. The wireless electronic lockset of claim 1, wherein the first wireless communication protocol comprises a near-field communication protocol.

3. The wireless electronic lockset of claim 2, wherein the second wireless communication protocol comprises a Bluetooth communication protocol.

4. The wireless electronic lockset of claim 1, wherein the wireless communication tag comprises an active near-field communication (NFC) tag having a memory, and wherein the value comprises a shared key stored in the memory.

5. The wireless electronic lockset of claim 4, wherein the processing unit is further configured to periodically update the shared key stored in the memory of the NFC tag.

6. The wireless electronic lockset of claim 1, further comprising a battery electrically connected to the processing unit and the motor.

7. The wireless electronic lockset of claim 1, wherein actuating the motor to move the locking bolt between the locked and unlocked positions comprises actuating the motor to move the locking bolt from the locked position to the unlocked position.

8. A method of actuating a wireless electronic lockset, the method comprising:
in response to detecting proximity of a mobile device to a wireless communication tag of the wireless electronic lockset, sending a value via a first wireless protocol to the mobile device;
in response to validation of the mobile device based on the value, receiving, via a second wireless communication protocol, an actuation command;
actuating a motor to move a locking bolt of the wireless electronic lockset between a locked and unlocked position;
updating the status of the wireless electronic lockset; and
disconnecting the mobile device from the wireless electronic lockset.

9. The method of claim 8, further comprising establishing a secure connection according to the second wireless communication protocol between the mobile device and the wireless electronic lockset prior to receiving the actuation command.

10. The method of claim 8, wherein the value comprises a shared key, and wherein the method further includes periodically updating the shared key stored in the memory of the wireless communication tag.

11. The method of claim 10, further comprising transmitting the shared key to a key server remote from the wireless electronic lockset.

12. The method of claim 11, wherein validation of the mobile device comprises comparing, at the key server, the shared key received from the wireless electronic lockset to the value as received from the mobile device.

13. A system for actuating a wireless electronic lockset, the system comprising:
  a wireless electronic lockset comprising:
    a processing unit, a locking bolt movable between a locked and unlocked position, a motor actuatable by the processing unit to move the locking bolt between the locked and unlocked positions, a wireless communication tag operable using a first wireless communication protocol, and a wireless interface communicatively connected to the processing unit, the wireless interface configured to communicate using a second wireless communication protocol different from the first wireless communication protocol;
  the processing unit executing instructions to perform:
    in response to detecting proximity of a mobile device to the wireless communication tag, sending a value stored in the wireless communication tag via the first wireless communication protocol to the mobile device and a server using the first wireless communication protocol, wherein the value is a random value;
  an application installable on the mobile device which, when executed, causes the mobile device to perform:
    establishing a secure connection to the wireless electronic lockset;
    receiving, from the processing unit, the value;
    receiving, from the server, the value;
    verifying that the value received from the processing unit matches the value received from the server; and
    sending an actuation command to the wireless electronic lockset,
  wherein based on a similarity correlation determining that the value sent to the mobile device and the value received from the mobile device at the wireless electronic lockset, actuating the motor to move the locking bolt between the locked and unlocked positions upon receiving the actuation command.

14. The system of claim 13, wherein the similarity correlation is performed by one or more of the mobile device, the wireless electronic lockset, and a cloud-based service communicatively accessible via the application.

15. The system of claim 13, wherein the value sent by the wireless electronic lockset changes periodically or in response to a request from a user.

16. The system of claim 13, wherein the wireless electronic lockset comprises Wi-Fi technology.

17. The system of claim 13, wherein the mobile device comprises at least one of a cellular telephone and a key fob.

18. A method of actuating a wireless electronic device lockset, the method comprising:
  establishing a secure connection to the wireless electronic lockset via a first communication protocol;
  in response to detecting a second communication protocol by being in close proximity to the wireless electronic lockset, receiving a value via the second wireless protocol to a mobile device;
  transmitting the value and an identifier, wherein the identifier is associated with an account that has been previously been associated with the wireless electronic lockset, to a key server for validation,
  in response to receiving a validation confirmation, transmitting an actuation command via the first communication protocol;
  updating a status of the wireless electronic lockset; and
  disconnecting via the first communication protocol, the mobile device from the wireless electronic lockset.

19. The method of claim 18, wherein the first wireless communication protocol comprises a near-field communication protocol.

20. The method of claim 18, wherein the wireless communication protocol comprises an active near-field communication (NFC) tag having a memory, and wherein the value comprises a shared key stored in the memory.

21. The method of claim 20, wherein the processing unit is further configured to periodically update the shared key stored in the memory of the NFC tag.

22. The method of claim 18, wherein transmitting the value and the identifier is performed using a third wireless protocol.

23. The method of claim 22, wherein the third wireless protocol comprises a cellular network communication protocol.

* * * * *